United States Patent

[11] 3,577,192

[72] Inventor Carl E. Schlaepfer
San Jose, Calif.
[21] Appl. No. 702,265
[22] Filed Feb. 1, 1968
[45] Patented May 4, 1971
[73] Assignee International Business Machines Corporation
Armonk, N.Y.

[54] REPRODUCE HEAD WITH PEAK SENSING CIRCUIT

2 Claims, 6 Drawing Figs.

[52] U.S. Cl. 340/174.1H
[51] Int. Cl. G11b 5/02
[50] Field of Search 340/174.1 (G), 174.1 (H); 346/74 (M); 179/100.2 (K)

[56] References Cited
UNITED STATES PATENTS

| | | | |
|---|---|---|---|
| 2,835,882 | 5/1958 | Beek | 340/174.1 |
| 2,961,642 | 11/1960 | Lamb | 340/174.1 |
| 3,215,995 | 11/1965 | Sierra | 340/174.1 |
| 3,337,859 | 8/1967 | Yoshii | 340/174.1 |
| 3,381,083 | 4/1968 | Jensen | 179/100.2 |
| 3,402,402 | 9/1968 | Dorrell et al. | 340/174.1 |

OTHER REFERENCES

Huskey, et al., COMPUTER HANDBOOK, 1st Ed., 1962, McGraw-Hill, pp. 2— 8 thru 2— 10

*Primary Examiner*—Bernard Konick
*Assistant Examiner*—Vincent P. Canney
*Attorneys*—Hanifin and Clark and Nathan N. Kallman

ABSTRACT: In an apparatus for reproducing a data signal recorded on a magnetic medium, a playback circuit comprising a transducer providing an electrical signal, a linear integrator coupled to said signal transducing means for detecting the peaks of the electrical signal and for developing a peak-detected signal that traverses and is equal to a reference signal level in substantially simultaneous time correspondence with said peak; and a wave shaper for producing a digital waveform having transitions in simultaneous time correspondence with said peaks.

*INVENTOR*
CARL E. SCHLAEPFER

BY Nathan N. Kallman

ATTORNEY

REPRODUCE HEAD WITH PEAK SENSING CIRCUIT

BACKGROUND OF THE INVENTION

1. Field of Invention

This invention relates to a novel and improved readout circuit, and in particular to a circuit useful for playback of magnetically recorded signals.

2. Description of Prior Art

In present magnetic recording systems, two important objectives, inter alia, are reliability and high density data storage. To this end, self-clocking modulation or coding techniques, such as double frequency modulation, are utilized. Furthermore, the use of a technique such as a double frequency modulation, obtains the advantages available with vestigial sideband modulation, wherein head response and resolution are important and frequency response is not significant. The physical configuration of the head, i.e., the geometry and dimensions of the transducing gap, and the like, determines signal resolution. Thus, magnetic heads are designed to match the operating parameters of the system. With a suitable matched head, the playback signal is ideally a true sinusoidal waveform without DC base line, and is limited in bandwidth whereby the signal-to-noise ratio is improved. The clean sinusoidal playback waveform may then be processed by a limiter to provide a high resolution signal output.

However, it is known that the head design, and particularly the head gap dimensions affords high resolution operation over a finite range of frequencies. For example, a head designed for high data density systems is not matched to very low density systems, and the problems of base line pedestals, wider bandwidth with attendant noise, and poor signal-to-noise ratio occur. It would be highly desireable to utilize the same head design for a wide range of signal densities, and yet attain optimum resolution.

In one known type of playback circuit employed for high density signal readout, a differentiator and a limiter are utilized in the output circuit of the magnetic head for processing of the read back signal. However, when the signal density is lower than that for which the head is designed for handling, the response characteristic of the head allows a base line to appear between pulses, with noise superimposed particularly on the base line portion between pulses. As a result, the effectiveness of the limiting action is lost. It is apparent that signal density and head response are closely interdependent, and that the designs of the playback head and head circuit are critical.

When mass producing magnetic heads, it would be advantageous and economical to utilize a uniform head design. It is highly desireable to provide a standardized magnetic head and a readout circuit, which are capable of processing low density as well as high density signals, or also, the same density signal at different head/surface speeds without loss of signal.

SUMMARY OF THE INVENTION

An object of this invention is to provide a novel and improved reproduce head circuit that has a wide dynamic range, and is also capable of operating effectively with low frequency as well as high frequency signals.

Another object of this invention is to provide a reproduce head circuit that is useful for detecting magnetically recorded signals on a card or ticket, or the like, and is not sensitive to variations in data rates.

Another object is to provide a playback circuit that is not sensitive to variations in relative speed between the readout head and the record medium.

A further object is to provide a circuit that is relatively insensitive to differences in head resolution.

Another object of this invention is to provide a playback head circuit that affords an improved signal-to-noise ratio.

According to this invention, a playback circuit for a magnetic storage apparatus comprises a peak sensor, such as a liner integrator for peak sensing the detected signal, and a high gain limiter or logarithmic amplifier that shapes the sensed signal prior to utilization. By means of such a circuit, the same magnetic head may be utilized for detection of recorded signals over a wide range of frequencies or packing densities. Also, the inventive circuit affords a system that is virtually insensitive to noise signal.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DESCRIPTION OF THE PREFERRED EMBODIMENT

For purpose of explanation, the description will be directed to the use of a double frequency recording technique, wherein the beginning of each bit cell is characterized by a transition, and data bits are represented by transitions at midcell. It should be understood, however, that other modulation or coding techniques, such as phase modulation, may be employed with the circuit disclosed herein.

Figure 1:
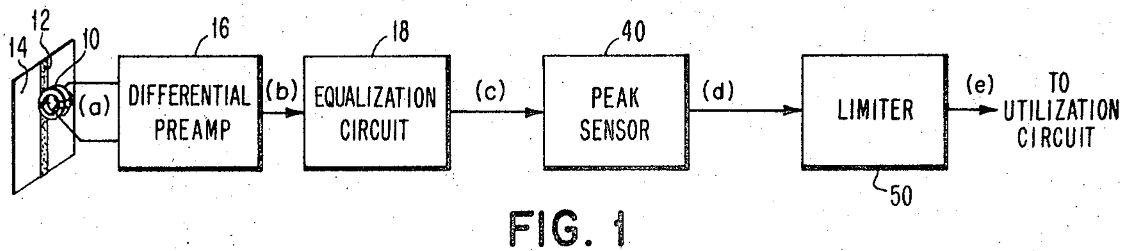
FIG. 1 is a schematic and block diagram of the readout circuit in accordance with this invention.

With reference to FIG. 1, a playback circuit for reproducing magnetically recorded information comprises a magnetic head 10, that cooperates with a magnetic medium, such as a magnetic strip 12 formed on a ticket or card 14. The head or transducer 10 is formed with a narrow gap, by way of example, and is capable of processing high frequency signals. The magnetic strip 12 contains a coded number or group of alphanumeric characters providing identification, account balances, or the like.

Figure 2:
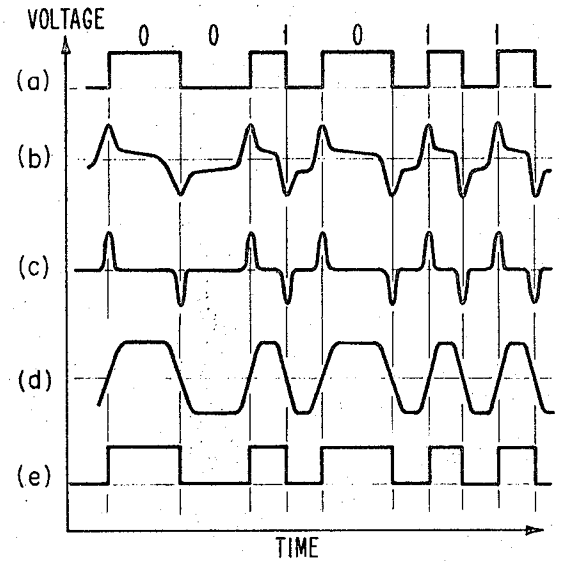
FIG. 2 is a series of waveforms related to the operation of the novel circuit of FIG. 1.

The coded data that is recorded within strip 12 is read out while the card 14 is moved relative to the head or transducer 10. It is understood that the card 14 may be held stationary, while the head 10 is moved; or both may be moved simultaneously, in order to provide relative motion. The recorded data, having a pattern such as shown in FIG. 2*a*, for example, is read out by the head 10, and is amplified by a differential preamplifier 16 that senses the transitions, and produces an amplified pulse signal having positive and negative peaks (see FIG. 2*b*). The preamplifier 16 is a low noise device that serves to amplify the signal to a predetermined level.

Figure 3A:
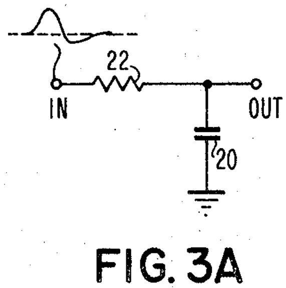
FIGS. 3A—C are schematic diagrams of equalization circuits useful with the readout circuit of FIG. 1.
Figure 3B:
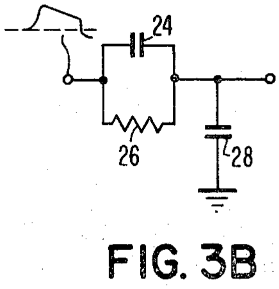
Figure 3C:
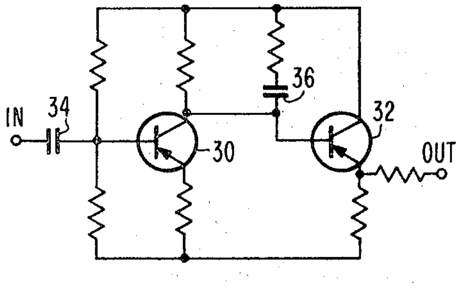

It is common to have a readout waveform with "overshoot" and "droop" characteristics, first and second order effects respectively, which require base line corrections. To this end, the amplified signal is directed from the preamplifier 16 to an equalization circuit 18, which compensates for base line problems that may appear in the reproduced signal, and produces a corrected or clean waveform. FIGS. 3A—C depict equalization circuits that may be used for correction of readout signals, which suffer from base line distortion in digital magnetic recording apparatus. The presence of such distortion in an amplitude sensitive detection system results in an increase in the noise level. Also, such base line distortion results in a decrease in pulse signal amplitude in certain pattern. Both effects tend to degrade the signal to noise ratio.

FIG. 3A illustrates a first order base line correction circuit including a capacitor 20 coupled between a resistance 22 and a source of reference potential, such as ground. This passive circuit compensator for "overshoot", which is a condition that may occur at low frequencies, below the pulse repetition rate of the system, when a pulse gradually falls off at the trailing edge and thus overshoots the base centerline. The effect of overshoot on an amplitude sensitive detection system is an addition of the pulse overshoot amplitude to base line noise, thus necessitating an increase in the noise clipping level.

FIG. 3B, on the other hand, represents a second order base line correction circuit that corrects for "droop", and incorporates a capacitor 24 and resistance 26 in parallel connected to a grounded capacitor 28. This filter circuit acts to eliminate the drooping shoulder at the trailing portion of a pulse.

An active first order correction circuit, which may be used with the playback circuit of FIG. 1, is set forth in FIG. 3C. This compensating circuit includes a pair of (PNP) transistors 30 and 32 and capacitors 34 and 36 respectively tied to the bases of the transistors. Effective equalization of a playback signal obtained from a magnetically recorded medium, by providing different gain at different frequencies, is thus accomplished. It should be understood, however, that the equalization circuit is not a necessary element of the present invention.

In accordance with this invention, the playback signal (FIG. 2C) is applied to a peak sensing circuit 40, such as an integrator, that provides an alternating waveform, as in FIG. 2D, which has zero crossings responding to the positive and negative peaks of the pulse signal in FIG. 2C. The integrator 40, which may be a high input impedance feedback amplifier with capacitive feedback, serves to make the received data signal suitable for limiting action. The linear integrator 40 is not dependent upon head characteristics and is not subject to amplitude changes at different speeds between the head and the record medium. By using a linear integrator in this playback circuit, the amplitude of the output signal from the integrator does not experience any appreciable change in response to variations in data rate from very low to very high density. Also, different fixed data rates, multiple data rates with different inputs to the same circuit, and varying data rates having flutter and wow may be accommodated.

Figure 4:
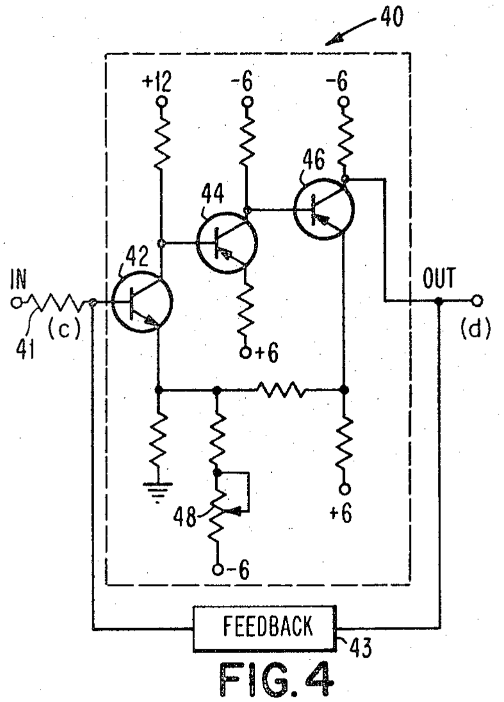
FIG. 4 is a schematic diagram of a circuit that may be used as the integrator and/or limiter of the circuit of FIG. 1.

FIG. 4 is a schematic circuit of an integrator 40 that may be utilized with the readout circuit of FIG. 1. The readout signal (FIG. 2C) is directed through a resistor 41 to the base of an NPN transistor 42. The output taken from the collector of the transistor 42 is applied to the base of a PNP transistor 44 which drives an output transistor amplifier 46 in the final stage of the linear integrator. To adjust the bias voltages to the emitters of the transistors, a variable resistance or potentiometer 48 is coupled therebetween. A capacitive feedback loop 43 is coupled between the output and input circuits of the integrator. The linear integrator 40 provides substantially the same output amplitude at any given density, no matter what the relative speed of travel is between the magnetic medium 14 and the sensing transducer or head 10.

The output of the linear integrator 40 is directed to a high gain limiter 50, which functions as a logarithmic amplifier or shaper. The limiter 50 senses the zero crossings of the integrator output waveform, and develops a square wave (FIG. 2E) in response thereto. This square wave 2E is substantially the same signal 2A that was recorded onto the magnetic strip 12. The limiter 50 may comprise a circuit similar to that depicted in FIG. 4 to accomplish the shaping function, except that the feedback loop 43 includes a pair of diodes. The diodes are coupled in parallel in the feedback loop between the output and input of the limiter 50 to provide large amplitude feedback. If the input signal is of relatively low amplitude, large gain is provided; whereas for a high amplitude input signal, the gain approaches unity. The shaped signal 2E is then channeled to a utilization circuit for readout and display, for example.

The circuit described herein is insensitive to speed variations and differences in waveforms, and therefore can accommodate different data rates, or multiple data rates with different inputs to the same circuit, or varying data rates having flutter and wow conditions. Thus, the data can be varied from very low to high repetition rate, without any appreciable change in the amplitude of the integrator output. The disclosed circuit is simple, economical, with a minimum number of parts, and has a greater dynamic range of input amplitude and speed. Furthermore, this circuit is far less subject to error due to spurious noise signals.

In an alternative embodiment, a low pass filter operable in the same useful frequency range as the linear integrator 40 may be used for peak sensing. In such case, the circuit response experiences a similar decrease, i.e., about 6 decibels per octave over the operating bandwidth. With either embodiment, the head response or resolution is such that the read back signal is substantially free of DC base line effects, attendant with a large improved signal-to-noise ratio.

While the invention has been particularly shown and described with reference to preferred embodiments thereof, it will be understood by those skilled in the art that the foregoing and other changes in form and details may be made therein without departing from the spirit and scope of the invention.

I claim:

1. In an apparatus for reproducing a data signal recorded on a magnetic medium, a playback circuit comprising:
means for recovering the magnetically recorded signal from said medium and for transducing such signal to an electrical signal;
linear integrating means coupled to said signal transducing means for detecting the peaks of the electrical signal and for developing a peak-detected signal that traverses and is equal to a reference signal level in substantially simultaneous time correspondence with said peak; and
means for shaping such peak detected signal to produce a digital waveform having transitions in simultaneous time correspondence with said peaks.

2. An apparatus as in claim 1, and further comprising an equalization circuit providing baseline correction coupled between said transducing means and said peak detecting means.